United States Patent  
Devine et al.

(10) Patent No.: US 12,218,744 B2  
(45) Date of Patent: Feb. 4, 2025

(54) ZONE CASTING LINKED TO SMART DEVICES WITH PUSH NOTIFICATION FUNCTIONALITY

(71) Applicant: LAZER ADDS, LLC, Wilmington, DE (US)

(72) Inventors: Chris Devine, Wilmington, DE (US); John Grosspietsch, Wilmington, DE (US); Mark Birchler, Wilmington, DE (US); Dennis Roberson, Wilmington, DE (US); Rick Ducey, Wilmington, DE (US)

(73) Assignee: LAZER ADDS, LLC., Wilmington, DE (US)

(*) Notice: Subject to any disclaimer, the term of this patent is extended or adjusted under 35 U.S.C. 154(b) by 64 days.

(21) Appl. No.: 17/855,096

(22) Filed: Jun. 30, 2022

(65) Prior Publication Data

US 2023/0006749 A1 Jan. 5, 2023

Related U.S. Application Data

(60) Provisional application No. 63/217,248, filed on Jun. 30, 2021, provisional application No. 63/217,253, filed on Jun. 30, 2021.

(51) Int. Cl.
G06Q 30/00 (2023.01)
G06Q 30/0251 (2023.01)
(Continued)

(52) U.S. Cl.
CPC ......... *H04H 20/72* (2013.01); *G06Q 30/0267* (2013.01); *H04H 20/59* (2013.01)

(58) Field of Classification Search
CPC ........ H04H 20/72; H04H 20/59; H04H 20/31; H04H 20/67; H04H 60/50; H04H 60/63;
(Continued)

(56) References Cited

U.S. PATENT DOCUMENTS 5,949,492 A * 9/1999 Mankovitz ............. H04H 20/28
455/154.1
6,163,683 A * 12/2000 Dunn .................... H04H 20/106
455/150.1

(Continued)

OTHER PUBLICATIONS

Ladtram: A Coalition Funded Framework for Localized Advertisements Over D2D. IEEE.2018. (Year: 2018).*

(Continued)

*Primary Examiner* — Maria V Vanderhorst  
(74) *Attorney, Agent, or Firm* — Barnes & Thornburg LLP

(57) ABSTRACT

A plurality of auxiliary transmitters associated with at least one main transmitter, transmitting broadcast area wide programming for their respective broadcast areas, wherein a mechanism enables switching on transmission of localized auxiliary information content by at least one of the plurality of auxiliary transmitters, wherein the at least one of plurality of auxiliary transmitters transmits localized auxiliary information content on a single frequency network transmission frequency, and wherein the localized auxiliary information content includes a data item that enables retrieval of promotional information from a remote server, when the data item is analyzed by a software application.

48 Claims, 6 Drawing Sheets

(51) Int. Cl.
*H04H 20/59* (2008.01)
*H04H 20/72* (2008.01)
*G05B 19/418* (2006.01)

(58) Field of Classification Search
CPC . H04H 2201/90; H04H 20/93; G06Q 30/0267
See application file for complete search history.

(56) References Cited

U.S. PATENT DOCUMENTS

| | | | | |
|---|---|---|---|---|
| 7,110,720 | B1* | 9/2006 | Henderson | H04H 20/71 |
| | | | | 455/39 |
| 8,862,048 | B2* | 10/2014 | Devine | H04H 20/103 |
| | | | | 455/503 |
| 2006/0015904 | A1* | 1/2006 | Marcus | H04N 7/16 |
| | | | | 348/E7.071 |
| 2012/0322487 | A1* | 12/2012 | Stanforth | H04W 16/14 |
| | | | | 455/509 |
| 2013/0217333 | A1* | 8/2013 | Sprigg | G06Q 30/02 |
| | | | | 455/41.2 |

OTHER PUBLICATIONS

"A New Worldwide Tracebility Technology to Complement GPS". IEEE. 2008 (Year: 2008).*

* cited by examiner

ZONE CASTING LINKED TO SMART DEVICES WITH PUSH NOTIFICATION FUNCTIONALITY

CROSS REFERENCE AND PRIORITY CLAIM

This United States Non-provisional Patent application relies for priority on U.S. Provisional Patent Application Ser. No. 63/217,248, filed on Jun. 30, 2021, entitled "ZONECASTING LINKED TO SMART DEVICES" and U.S. Provisional Patent Application Ser. No. 63/217,253, filed on Jun. 30, 2021, entitled "ZONECASTING PUSH PROMOTIONS TO SMART DEVICES" the disclosures of which are all being incorporated by reference in their entireties.

FIELD

Disclosed embodiments are directed, generally, to radio broadcasting equipment, as system and methodologies that enable targeted radio broadcast delivery of promotional material to a potential consumer.

BACKGROUND

Broadcasters, whether radio or television, obtain revenue by selling advertising commercial time, wherein the commercials, or "spots" are incorporated into the content broadcast by the broadcaster in broadcasting listening area. Typically, in radio, such broadcasters' listening areas are associated with a national, metropolitan area or geographic region and commercial time is sold to advertisers within that area or region.

However, conventionally, the value of such commercial time is, in part, based on the number of listeners that are potentially hearing a commercial; nevertheless, the effectiveness of those commercials (and the promotional material included therein) in persuading a listener to partake of an advertised product or service or visit an advertiser's location may be based, at least in part, on the availability of the advertiser's product, service or location to a listener. Thus, although a radio station listener may hear an advertiser's commercial, the likelihood that the listener may purchase the advertiser's product/service or visit the advertiser's location is at least in part based on the availability of advertiser's product/service or proximity of the advertiser's location.

Still further, in some cases the promotional material details included or referred to in the commercial are too voluminous or complicated for the listener to remember and record in the time of the commercial. This is particularly true if the listener is also driving a vehicle or engaged in another activity while listening to the advertisement. These deficiencies severely limit the efficacy of the commercial in persuading a listener to partake of an advertised product or service or visit an advertiser's location.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, a system, associated component(s) and method operations are provided that enable a system and method operations to utilize the functionality of local zone cast casting boosters to deliver geotargeted advertising content in a form that is easily transferable to a smart device to enable the ability for a potential consumer to easily capture data in some fashion, e.g., a coupon, screenshot, or discount code or simply an address and/or phone number or website location with them after they leave their transportation vehicle or other activity and use it when purchasing a good or service.

Thus, for example, radio broadcasting equipment may include a plurality of auxiliary transmitters associated with at least one main transmitter that transmits broadcast area wide programming for their respective broadcast areas, wherein a mechanism enables switching on transmission of localized auxiliary information content by at least one of the plurality of auxiliary transmitters, wherein the at least one of the plurality of auxiliary transmitters transmits localized auxiliary information content on at least one a single frequency network, and wherein the localized auxiliary information content includes a data item that enables retrieval of additional information, which may include promotional information, from a remote server, when the data item is analyzed by a mobile or other smart device software application.

In accordance with various embodiments, the invention may be practiced with, for example, AM, FM or HD Radio™.

BRIEF DESCRIPTION OF FIGURES

A more complete understanding of the disclosed embodiments and the utility thereof may be acquired by referring to the following description in consideration of the accompanying drawings, in which like reference numbers indicate like features, and wherein.

DETAILED DESCRIPTION

Figure 1:
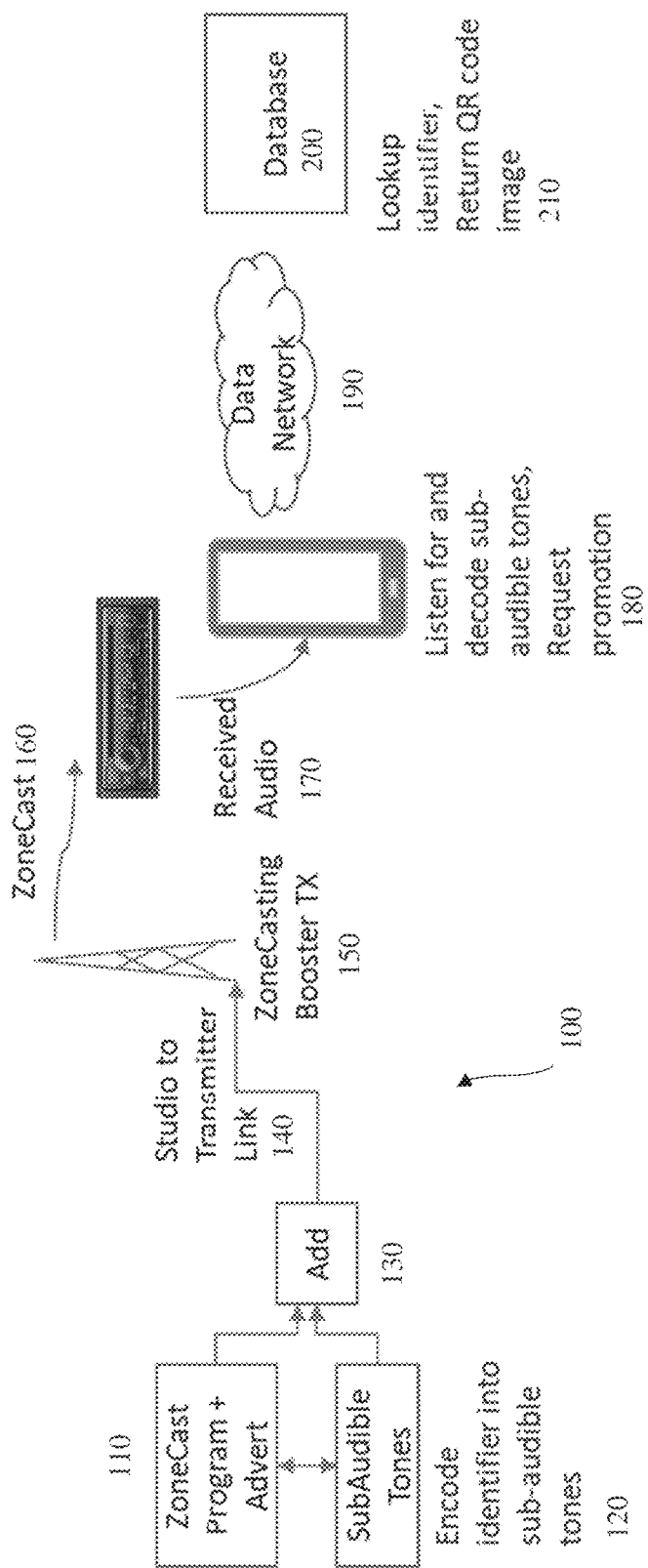
FIG. 1 provides a system diagram for inserting sub-audible identifiers to deliver QR codes or other promotional information to a smart device via a localized zone cast in accordance with the disclosed embodiments.

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

It should be understood that the term "radio broadcaster" is meant to include organizations and/or individuals involved in the broadcast of audio radio broadcasting area wide programming (local, regional, national) and localized auxiliary information. The term "broadcasting area wide programming" or "license coverage area" is meant to include, for example, programming content that is intended to be distributed throughout a particular broadcasting area or more than one area including regional or national areas if multiple radio broadcasters are included for example in radio network broadcasting; thus, depending on the format of the station, such programming may include, for example, talk radio programs, music programs, songs, sporting event coverage, etc. Likewise, the term "localized auxiliary information" is meant to include, e.g., advertisements, public safety information, public service information, emergency broadcast information, program related content, etc. Thus, radio broadcasters are not limited to individuals or organizations owning licenses for radio broadcasting; however, the term radio broadcaster does include such individuals or organizations.

In explaining the operation of various disclosed embodiments, description of one or more "main transmitters" and "booster transmitters" is provided. It should be understood that the term "main transmitter" encompasses a transmitter that may be, for example, the only transmitter used by a radio broadcaster in a particular radio broadcasting area, or it may be the most powerful (or one of the most powerful) transmitters comprising a single frequency network in the radio broadcasting area.

To the contrary, the term "booster transmitter" (which is interchangeable with the term "signal boosters" and "auxiliary transmitter") includes low-power transmitters (relative to the maximum class of the main transmitter), which are conventionally used to improve communications in locations within the normal coverage area of a radio system where the radio signal is blocked or shielded due to natural terrain or man-made obstacles (e.g., to provide fill-in coverage but not increase the normal coverage area).

As explained in U.S. Pat. No. 9,232,481, entitled "EQUIPMENT, SYSTEM AND METHODOLOGIES FOR ROBUST COVERAGE IN A BROADCAST AREA" and U.S. Pat. No. 8,862,048, "EQUIPMENT, SYSTEM AND METHODOLOGIES FOR SEGMENTATION OF LISTENING AREA INTO SUB-AREAS ENABLING DELIVERY OF LOCALIZED AUXILIARY INFORMATION" (both expressly incorporated by reference herein), a segmented listening area that is configured to deliver localized auxiliary information may utilize "zones" within the FCC defined service area of a radio broadcast transmitter associated with a particular broadcaster. These zones may contain 1 to N number of on-channel, same frequency boosters that broadcast, in a simulcast manner, during specific instances in time.

Although advertisers reach large audiences by purchasing commercial time from broadcast and Internet media providers, targeting advertisements to specific localized geographical areas is desired by advertisers and is available through other traditional and digital publishers offering advertising supported media targeting local audiences.

As discussed in those references, in an FM implementation, the design of geographic zones may be such that the signal power from the on-channel boosters in a zone may radiate a signal significantly stronger than the broadcaster's main station transmitter in the zone. Therefore, FM receivers in the zone capture on the on-channel booster signal rather than the main transmitter signal by using signal processing in its circuitry and software to compare received signals from the main and auxiliary transmitters and rejecting the weaker signal. Thus, a broadcaster can transmit different, local audio information to the specific zone versus what is broadcast over the main transmitter. At the same time, there may exist several other on-channel zones within the listening area that are simultaneously, and/or independently, broadcasting different information that the broadcaster wants to transmit in that particular zone. These zones may be separated geographically so as not to emit transmission signals that interfere with each other.

Further, optionally, promotional content may be transmitted from the booster transmitter(s) in a Time Division Multiplex Access (TDMA) frame structure such that the information to be broadcast on each transmitter does not overlap in time. As a result, the booster transmitter(s) can transmit on multiple RF frequencies separated by time, and provide localized auxiliary content transmission on different transmission frequencies within the particular zone(s) of more than one radio broadcaster.

With this understanding of the technical aspects of at least some radio broadcasting in mind, it is known further that one media that is widely used for advertising is FM broadcast radio. Many listeners of FM broadcasts are drivers or passengers in automobiles. Conventionally, FM broadcasters reach a large geographic area using a main transmitter and one or more auxiliary transmitters simulcasting the main transmitter broadcast such that listeners hear the same commercial everywhere the FM broadcast signal reaches. As a result, localizing an advertisement to reach an area smaller than the typical FM broadcast signal footprint has not been possible.

Another media that is widely used for advertising is HD Radio™, which is also frequently used to reach drivers or passengers in automobiles. HD Radio™ is the brand name one implementation of In-Band On-Channel (IBOC) digital radio broadcast technology, which can use a portion of the existing radio station frequency allocation to simulcast an existing analog radio station in digital format with less noise and with additional text and graphical information. In implementation, the system actually broadcasts unused channels adjacent to an existing radio station's allocation leaving the original analog signal intact, allowing enabled receivers to switch between digital and analog.

Conventionally, potential consumers now use smart devices such as smartphones, smart watches, tablets, and laptops to receive, collect and save information and data for later use. For example, coupons, sales and other promotional material, and loyalty program identifiers can be collected and stored on smart devices.

Moreover, listeners of broadcast radio audio advertisements have to memorize a slogan, contact information (physical, telephone, Internet or other) or a discount code, or remember the time and place of an advertised offer.

As a result, there is no effective way for advertisers on FM broadcast stations to both target localized audiences and to deliver advertising content to listeners' smart devices in the localized audience while minimizing the need for listener actions.

Conventionally, various mechanisms have been proposed and implemented for targeted advertising that exploits the ability of zone cast casting to transmit local information from FM broadcast boosters. However, these targeted advertisements pertain to audio programming and do not interact with a smart device.

Xperi™ (Ibiquity®) has proposed targeting audiences via each of the HD1-4 audio sub-channels. This targeting, however, is demographic-based, not geographic and, as a result, fails to serve localized audiences.

Xapp® has proposed use of speech recognition to allow a listener to interact with broadcast radio content including advertising. However, that interaction is limited to the broadcast radio receiver and must be augmented with wide area networking and computing resources to perform actions requested by a listener.

Still further, SiriusXM® has proposed use of a receiver with an included flash memory card that potential consumers would need to remove and then insert into a personal computer or other non-radio enabled processing device in order to take advantage of an offer to purchase music. Of note, SiriusXM is a satellite broadcast service that covers extensive geographic areas and only uses boosters to provide coverage in places where the satellite signal is blocked such as tunnels.

StratosAudio® has proposed a system, in which an offer code is displayed as text on a receiver using the Radio Broadcasting Database System (RBCS). However, the potential consumer is required to memorize or save that text data.

With this understanding of the technical landscape in mind, it should also be noted that social media tools, services and platforms collect data on their members' activities and interests, and data aggregation companies collect data on potential consumers, to provide detailed information to advertisers to enable more focused and effective campaigns. Nevertheless, such fine-grained demographic data does not include location specific data, in particular, if a potential consumer is travelling by automobile, to provide targeted advertising to that potential consumer on a real time or near real time basis.

In accordance with disclosed embodiments, a system and method operations utilize the functionality of local zone cast casting boosters to deliver advertising or other content in a form that is easily transferable to a smart device. As discussed above, zone casting enables advertisers to reach localized audiences in selected neighborhoods within a larger FM broadcast footprint. For example, disclosed embodiments enable the ability for a potential consumer to easily take a coupon or discount code with them after they leave their transportation vehicle and use it when purchasing a good or service.

QR codes are graphical encodings of data that is machine readable. Data may include encoded text that comprise links known as URLs as well as information such as an image file of a sales coupon. In use, for example, restaurants conventionally place QR code graphics that encode the URL or web address, or a link to a downloadable file of their menus. Smart devices include cameras that can decode QR codes and recover the encoded text. The link can then be followed to download the information that the QR code text referenced.

In implementation of the disclosed embodiments, a server may provide the information needed by each booster to provide the local content. Additionally, the sever schedules the insertion of the local content in each booster's programming.

FIG. 1 illustrates a system 100 for inserting sub-audible identifiers to deliver QR codes or other promotional material to a smart device via a localized zone cast in accordance with the disclosed embodiments.

As shown in FIG. 1, an advertising server (not shown) may insert (see 130) unique subaudible tone sequences or non-interfering audio tone sequences implemented as an audio watermark or other similar encoding 120 into the programming and promotional material (e.g., advertising) 110 and transmit (see 140) that combination to a zone casting booster 150. Such subaudible tones can contain a data item that enables retrieval of additional information, e.g., promotional information such as a coupon or discount code. The subaudible tones can also carry identifiers such as a URL that links to more detailed information.

Thereafter, the local zone casting booster 150 transmits (see 160) the combination for receipt by a radio receiver 170 for subsequent output to one or more potential consumers, e.g., in a transportation vehicle. As a result of that transmission and receipt, a software application potential consumer's smart device may monitor (see 180) for the subaudible tone sequences 120.

More specifically, in accordance with at least one embodiment, the software application on the potential consumer's smart device may use the smart device's microphone to listen for subaudible tones 120. After detecting the presence of a subaudible code and decoding the subaudible tones, the software application saves the promotional information provided therein and/or may retrieve more detailed promotion information using a smart device data connection to one or more data networks 190 (e.g., private and/or public networks such as the Internet but also including one or more wireless mobile networks). Such detailed promotion information may be stored in a database 200 that may be collocated with the server that provided the subaudible tones 120 or remote therefrom. Such more detailed information may include a QR code image file that may, when scanned, provide promotional details and material including, for example, limited time offers, coupons, advertisement *circulars*, etc.

Accordingly, it should be understood that radio broadcasting equipment comprising may include a plurality of auxiliary transmitters associated with at least one main transmitter, the main transmitter(s) transmitting broadcast area wide programming for their respective broadcast areas, wherein a mechanism enables switching on transmission of localized auxiliary information content by at least one of the plurality of auxiliary transmitters, wherein the at least one of the plurality of auxiliary transmitters transmits localized auxiliary information content on at least one of the transmission frequencies, and wherein the localized auxiliary information content includes a data item that enables retrieval of additional information from a remote server, when the data item is analyzed by a software application.

As explained above, the additional information may be promotional information specific to an advertiser with a location within a broadcast area geographic region that corresponds to a location of the at least one of the plurality of auxiliary transmitters within the broadcast area. Thus, it should be appreciated that the software application may determine a geographic location of the potential consumer using the smart device and use that location information to determine what additional information is to be retrieved from the remote database.

In implementation, in accordance with at least one embodiment provided in connection with HD Radio, the invention utilizes HD Radio's ability to includes the capacity to transmit data files along with digital audio. For example, one specific HD Radio capability includes the ability to send image files to an FM radio so that the FM radio can display detail song title, artist information or an album cover photograph on the FM radio display. The data files can also include QR code image files for immediate or later display in place of artist information.

Figure 2:
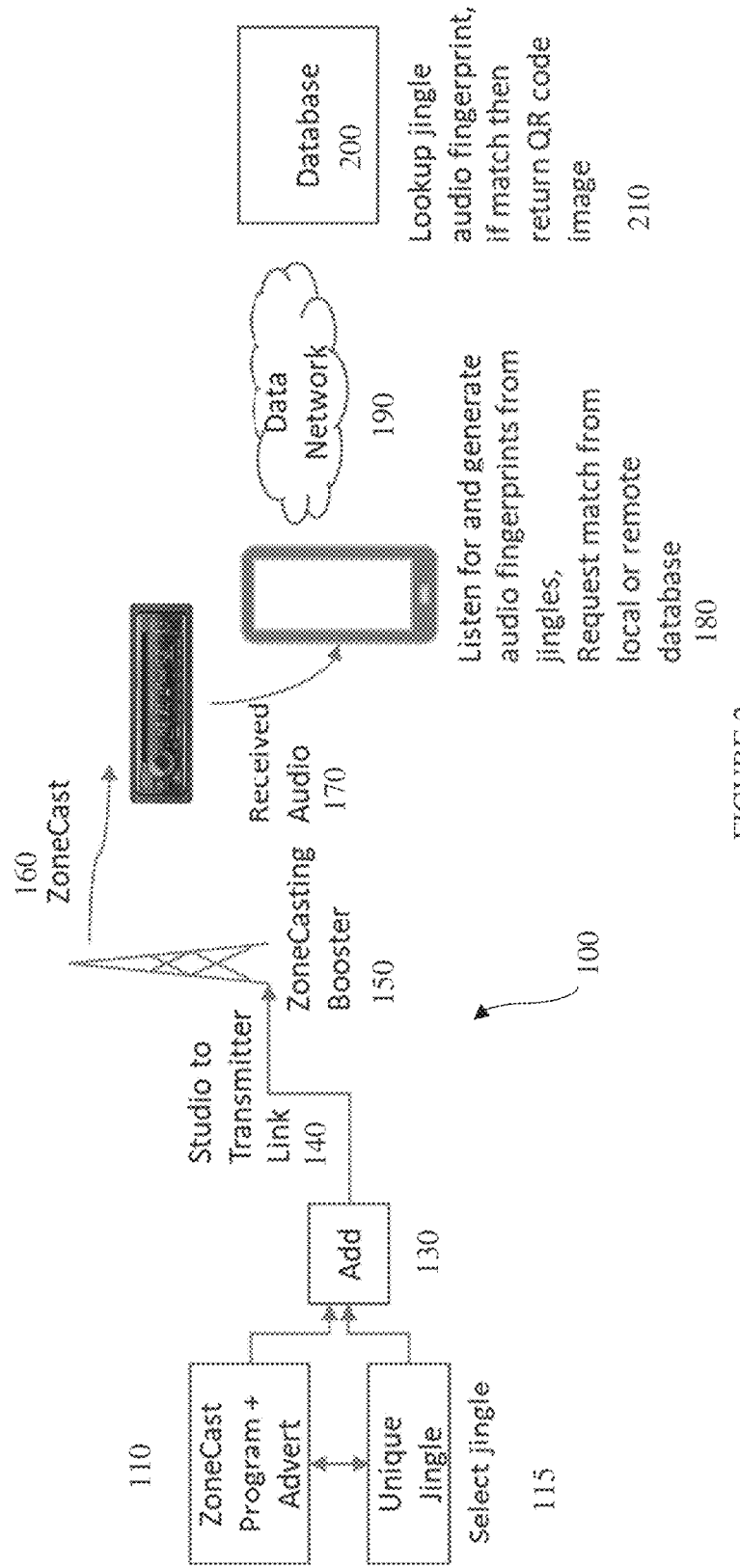
FIG. 2 provides a system diagram for using jingles to trigger the delivery of QR codes or other promotional information to a smart device via a localized zone cast in accordance with the disclosed embodiments.

In accordance with at least another embodiment, an advertising server insert or includes unique audible jingles in the advertising transmitted by a local zone casting booster. FIG. 2 illustrates a system diagram for such a system for using jingles 115 to trigger the delivery of QR codes or other promotional or identifying material to a smart device via localized zone cast in accordance with the disclosed embodiments. In such an implementation, the software application may monitor the broadcast advertising information and performs an audio fingerprinting computation based on the detection of a uniquely identifying jingle. For example, such an audio fingerprint may include a numeric code generated to form an audio signal that captures the unique time-frequency signature of the audio signal. Thereafter, the software application may then submit a request to the database to search and compare with previously computed audio fingerprints of selected jingles. If there is a match between the submitted audio fingerprint and one of the stored audio fingerprints, then the database returns a QR code or promotional or identifying material associated with the identified and referenced jingle.

In accordance with at least another additional embodiment, QR codes or local promotional images may be transmitted using data transfer capabilities of the HD Radio system.

In accordance with at least one embodiment, a software application on a potential consumer's smart device may be paired, using RFID, Bluetooth®, WiFi®, USB, NFC, or other connection, with an entertainment system, e.g., a transportation vehicle's infotainment system, etc. to enable file transfer from the system to the potential consumer's smart device using the previously established Bluetooth® or other connection. Thereafter, a QR code or promotional images may be automatically sent or pushed to the mobile software application on the potential consumer's smart device for receipt, collection storage and subsequent use.

Figure 3:
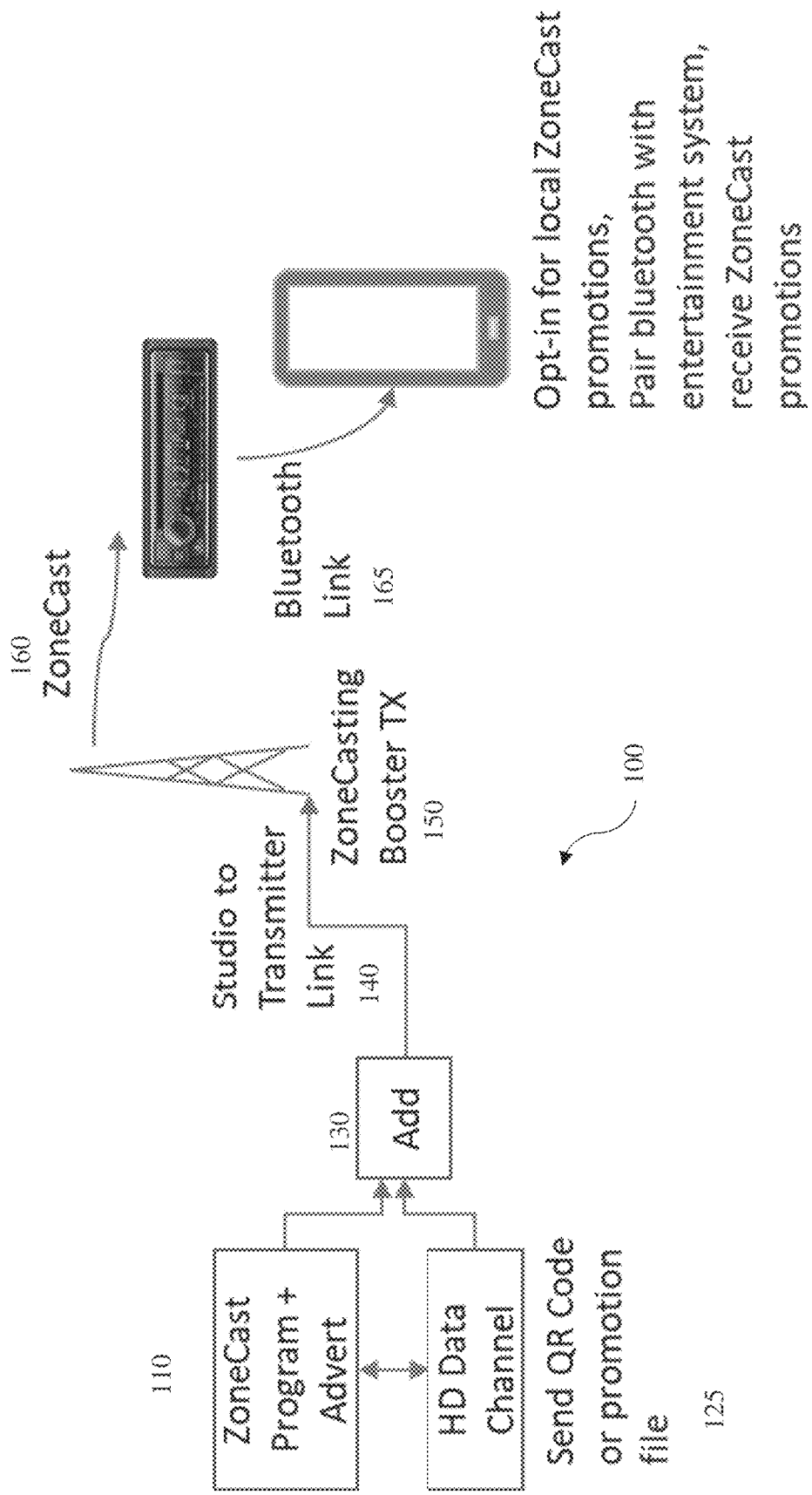
FIG. 3 provides a system diagram for delivering QR codes using a smart device software application and a camera to capture an entertainment or infotainment system display, RFID, Bluetooth®, WiFi®, USB, NFC, or other link with the vehicle entertainment system via a localized zone cast in accordance with the disclosed embodiments.

FIG. 3 provides a system diagram for delivering QR codes using a smart device software application and a Bluetooth®, RFID, WiFi®, USB, NFC or other link with the vehicle entertainment system via a localized zone cast in accordance with the disclosed embodiments. In particular, in implementation, disclosed embodiments may use the digital file transfer capability of HD Radio and the localized broadcast capability of zone casting to display a QR code containing information for potential consumers in a localized region. The QR code can contain information about local sales promotions, services promotion, discount offers, or any other information an advertiser wants to give to potential consumers. The potential consumer can easily take a photograph or use a barcode reading application on their smart device to save the information for later use. As a result, the potential consumer can opt in for local zone cast promotions 175.

Figure 4:
FIG. 4 illustrates an example of a dashboard entertainment system display including audience experience items provided in accordance with the disclosed embodiments.

FIG. 4 illustrates an example of a dashboard entertainment system display including audience experience items provided in accordance with the disclosed embodiments. As shown in FIG. 4, the dashboard entertainment system that includes a screen 400 that may be output on a radio receiver (e.g., FM and/or HD Radio) discussed above. That screen 400 may include various data and information associated with the radio broadcast content. In particular, a textual description of the broadcast content 410 may be displayed along with a Graphical Interterchange File (GIF) image or some other similar file that provides a visual representation of the broadcast content 420. In addition, an indication of the broadcaster 430 of the broadcast content may be displayed. Still further, some indication of which HD channel has been selected (e.g., HD 1, HD 2 (illustrated here) or HD-3 and HD-4) may be shown at 440.

Accordingly, FIG. 4 illustrates a simplified view of the dashboard screen of a typical HD Radio entertainment system. However, it should be understood that the disclosed embodiments are not limited to an HD Radio implementation.

Figure 5:
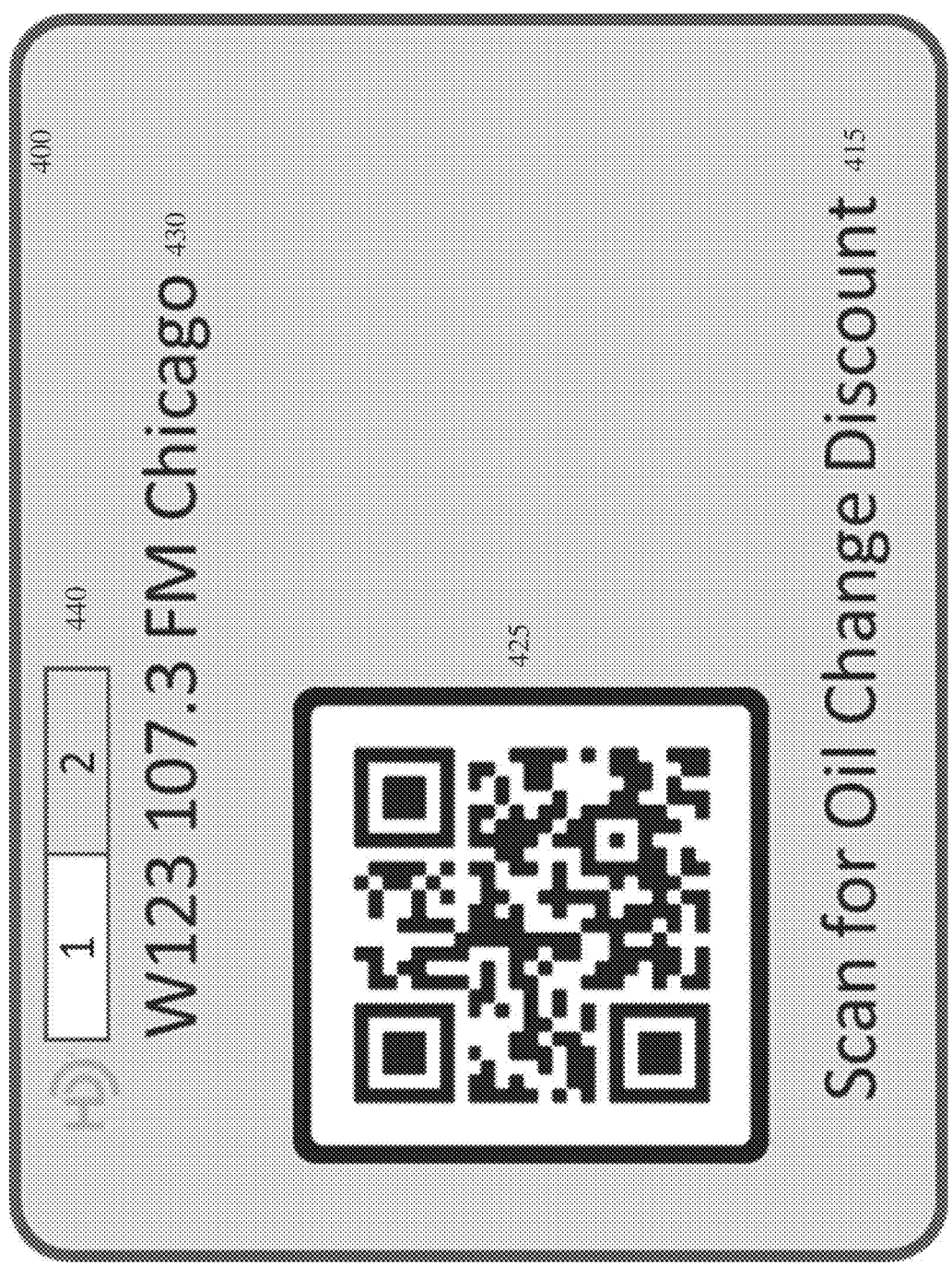
FIG. 5 illustrates an example of a dashboard entertainment system display, which may include a QR code while a vehicle is stopped in accordance with the disclosed embodiments.

As shown in FIG. 5, such a dashboard screen 400 of the entertainment system display is shown during a commercial break. A text description of the advertiser 415 and a QR code 425 (or other appropriate visual encoding scheme) with the link to a website or a downloadable coupon file is presented. A potential consumer may then simply use their smart device camera app or a specialized barcode reader app to read the link encoded in the QR code. The QR code (or other encoding) may then be saved to present at a store or service provider to receive a discount. Alternatively, the QR code, if it is a URL link, can be selected to download a data file such as an image file of a coupon or other promotional or informational material.

Figure 6:
FIG. 6 illustrates an example of a dashboard entertainment system display, which may include a QR code while a vehicle is moving in accordance with the disclosed embodiments.

It should be appreciated that, optionally, the radio receiver may also make use of an automobile's safety features to prevent display of a QR code while the vehicle is moving or the transmission is positioned in drive. Nevertheless, optionally, the QR code may be saved in the radio receiver upon receipt and displayed as soon as the vehicle is stopped or the vehicle is placed into Park. Thus, FIG. 6 illustrates the display screen when the vehicle is in motion preventing the display of the QR code. Therefore, as shown in FIG. 6, the QR code may be obscured 435 to inhibit scanning the ability for a potential consumer to scan the QR code.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, it should be understood that various disclosed embodiments relate to the broadcasting of both analog radio broadcasting signals and digital radio broadcasting signals. Thus, it should be understood that the embodiments are not limited to analog radio broadcasting and may by utilized in digital audio radio broadcasting, for example, Eureka 147 (also known as Digital Audio Broadcasting (DAB)), 'DAB+, FM band in-band on-channel (FM IBOC) broadcasting including HD Radio (OFDM modulation over FM and AM band IBOC sidebands) and FMeXtra (FM band IBOC subcarriers), Digital Radio Mondiale (DRM) and its extension (DRM+) (OFDM modulation over AM band IBOC sidebands), AM band in-band on-channel (AM IBOC) including HD Radio (AM IBOC sideband) and DRM, Satellite radio including, e.g., WorldSpace, Sirius XM radio, and MobaHo!, Integrated Services Digital Broadcasting (ISDB), Low-bandwidth digital data broadcasting over existing FM radio and Radio Data System (also known as RDS), etc.

It should be appreciated that, in accordance with at least one embodiment of the invention, the system may be implemented in conjunction with the transmission of digital radio signals rather than analog radio signals. Moreover, it should be appreciated that at least one embodiment of the invention may be implemented in conjunction, and be compatible, with the DAB standard to enable implementation outside the United States radio markets.

Further, it should be appreciated that the various disclosed embodiments and their individual aspects and features also may be utilized in the transmission of analog and/or digital television signals.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

Unless otherwise expressly stated, it is in no way intended that any operations set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

For example, it should be understood that, in conjunction with the disclosed embodiments, radio network programming may include subaudible triggers that activate local station auxiliary transmitters. For example, a QR code could be transmitted to "urban transmitters" while another QR code could be transmitted to "rural transmitters". More specifically, an organization could sell a network advertisement that could have zone casting triggers to deliver different promotional offers for rural vs urban listeners, e.g., this type of "split copy" for the audio portion of the advertisement. Such an approach may support providing QR codes and other data to be associated with these "split copy" network advertisements to make them more relevant and engaging to listeners.

Likewise, as discussed above, in accordance with at least one embodiment of the invention, a system, associated component(s) and method operations are provided that enable a system and method operations to utilize the functionality of local zone cast casting boosters to deliver geotargeted advertising content in a form that is easily transferable to a smart device to enable the ability for a potential consumer to easily capture data in some fashion, e.g., a coupon, screenshot, or discount code or simply an address and/or phone number or website location with them after they leave their transportation vehicle or other activity and use it when purchasing a good or service, e.g., attending a 4th of July Fireworks display which is supported by a radio broadcast.

Although the utility of various invention embodiments has been described in connection with the distribution of promotional content, it should be understood that distributed information is not limited to promotional content but may also or alternatively include non-promotional material.

Thus, for example, in accordance with at least one embodiment of the invention, an optional emergency services announcement component may be included. Such a component may be implemented, for example, to be responsive to a wirelessly communicated notification transmitted via a wireless transmitter under the control of emergency services personnel. Thus, in the event that an emergency announcement is required, fire, police or other emergency services department personnel may interrupt a regular broadcasting to trigger broadcasting in one or more (or all) subsets of a broadcasting area to provide emergency information regarding, a forest fire, a tornado warning, flash flood warnings, etc. Still further, a transmitted and output QR code may be used to provide additional information, e.g., tornado shelter locations or flood evacuation routes in a localized area.

Likewise, it should be appreciated that emergency services personnel could utilize this type of wireless communicated geotargeted notification for implementing an AMBER Alert type announcement to disseminate information associated with child-abduction situations, e.g., an output QR code made be used to provide the ability to access a picture of a missing child and/or details regarding their last location, apparel, special issues associated with the child, etc.

The invention claimed is:

1. Radio broadcasting equipment comprising:
   a plurality of auxiliary transmitters associated with at least one main transmitter that transmits radio broadcast area wide programming for a radio broadcasting station in a radio broadcast service area licensed by the Federal Communications Commission (FCC), wherein the FCC radio broadcast service area is specific to and limited to a geographic region licensed by the FCC, wherein the radio broadcasting station transmits radio broadcast area wide programming in the FCC radio broadcast service area on both the at least one main transmitter and the plurality of auxiliary transmitters on a single frequency network transmission frequency licensed by the FCC in the FCC licensed radio broadcast service area for transmission using the plurality of auxiliary transmitters and the corresponding at least one main transmitter; and a controlling mechanism that controls the plurality of auxiliary transmitters to switch on transmission of localized auxiliary information content by at least one of the plurality of auxiliary transmitters on the single frequency network transmission frequency licensed to the radio broadcasting station licensed by the FCC in the FCC licensed radio broadcast service area for transmission using the plurality of auxiliary transmitters and the corresponding at least one main transmitter, wherein the localized auxiliary information content includes a data item that enables automatic retrieval of additional information that is different and in addition to the radio broadcast area wide programming, wherein the additional information is automatically retrieved from a remote server by equipment that includes at least one receiver configured to receive radio broadcast content, wherein the at least one receiver receives the data item and includes a software application configured to receive and analyze the received localized auxiliary information, output at least a portion of the localized auxiliary information content to a user, and automatically retrieve the additional information for output to the user from the remote server in response to the data item being analyzed by the software application, and wherein the additional information is information that is specific to a location within the radio broadcast area geographic region of the FCC licensed radio broadcasting station's area that corresponds to both a location of the at least one receiver receiving the radio broadcast content and a location of the at least one of the plurality of auxiliary transmitters within the FCC licensed radio broadcast service area.

2. The radio broadcasting equipment of claim 1, wherein the data item is a Quick Response (QR) code.

3. The radio broadcasting equipment of claim 1, wherein the localized auxiliary information includes an indication of identity of the advertiser.

4. The radio broadcasting equipment of claim 1, further comprising the at least one receiver configured to receive radio broadcast content, wherein the localized auxiliary information includes instructions to obscure display of the data item depending on movement of the at least one receiver.

5. The radio broadcasting equipment of claim 4, wherein the localized auxiliary information is stored in the at least one receiver in preparation of displaying the data item following detection that the at least one receiver is stationary.

6. The radio broadcasting equipment of claim 4, wherein the at least one receiver is included in a transportation vehicle.

7. The radio broadcasting equipment of claim 6, wherein a determination of whether to output the data item on a display that is part of an infotainment system included in the transportation vehicle is performed and is based on a state of the transportation vehicle determined based on data received from the infotainment system.

8. The radio broadcasting equipment of claim 7, wherein the data received from the transportation vehicle indicates whether the transportation vehicle is in park.

9. The radio broadcasting equipment of claim 1, wherein the additional information provides details associated with an America's Missing: Broadcast Emergency Response (AMBER) alert or a localized emergency within the broadcast area.

10. The radio broadcasting equipment of claim 1, wherein the equipment transmits at least one of Amplitude Modulation (AM), Frequency Modulation (FM) and Hybrid Digital (HD) Radio signals.

11. The radio broadcasting system of claim 1, wherein the additional information is promotional information that is specific to an advertiser with a location within the broadcast area geographic region that corresponds to the location of the at least one of the plurality of auxiliary transmitters within the broadcast area.

12. The radio broadcasting system of claim 1, wherein the retrieval of the additional information is also based on location information indicating a location of the at least one receiver to determine what additional information is to be retrieved from the remote server.

13. A method to transmitting broadcast area wide programming content and localized auxiliary information content within a single broadcast area using radio broadcasting equipment, the method comprising:

operating a plurality of transmitters including a main transmitter and a plurality of auxiliary transmitters configured to transmits radio broadcast area wide programming for a radio broadcasting station in a radio broadcast service area licensed by the Federal Communications Commission (FCC), wherein the FCC radio broadcast service area is specific to and limited to a geographic region licensed by the FCC, wherein the radio broadcasting station transmits radio broadcast area wide programming in the FCC radio broadcast service area on both the at least one main transmitter and the plurality of auxiliary transmitters on the single frequency network transmission frequency licensed by the FCC in the FCC licensed radio broadcast service area for transmission using the plurality of auxiliary transmitters and the corresponding at least one main transmitter; and controlling the plurality of auxiliary transmitters to switch on transmission of localized auxiliary information content by at least one of the plurality of auxiliary transmitters on the single frequency network transmission frequency licensed to the radio broadcasting station licensed by the FCC in the FCC licensed radio broadcast service area for transmission using the plurality of auxiliary transmitters and the corresponding at least one main transmitter, wherein the localized auxiliary information content includes a data item that enables automatic retrieval of additional information that is different and in addition to the radio broadcast area wide programming, wherein the additional information is automatically retrieved from a remote server by equipment that includes at least one receiver configured to receive radio broadcast content, wherein the at least one receiver receives the data item and includes a software application configured to receive and analyze the received localized auxiliary information, output at least a portion of the localized auxiliary information content to a user, and automatically retrieve the additional information for output to the user from the remote server in response to the data item being analyzed by the mobile software application, and wherein the additional information is information that is specific to a location within the radio broadcast area geographic region of the FCC licensed radio broadcasting station's area that corresponds to both a location of the at least one receiver receiving the radio broadcast content and a location of the at least one of the plurality of auxiliary transmitters within the FCC licensed radio broadcast service area.

14. The radio broadcasting method of claim 13, wherein the data item is a Quick Response (QR) code.

15. The radio broadcasting method of claim 13, wherein the localized auxiliary information includes an indication of identity of the advertiser or publisher.

16. The radio broadcasting method of claim 13, wherein at least one receiver configured to receive radio broadcast content, wherein the localized auxiliary information includes instructions to obscure display of the data item depending on movement of the at least one receiver.

17. The radio broadcasting method of claim 16, wherein the localized auxiliary information is stored in the at least one receiver in preparation of displaying the data item following detection that the at least one receiver is stationary.

18. The radio broadcasting method of claim 16, wherein the at least one receiver is included in a transportation vehicle.

19. The radio broadcasting method of claim 18, wherein a determination of whether to output the data item on a display that is part of an infotainment system included in the transportation vehicle is performed and is based on a state of the transportation vehicle determined based on data received from the infotainment system.

20. The radio broadcasting method of claim 19, wherein the data received from the transportation vehicle indicates whether the transportation vehicle is in park.

21. The radio broadcasting method of claim 13, wherein the additional information provides details associated with an America's Missing: Broadcast Emergency Response (AMBER) alert or a localized emergency within the broadcast area.

22. The radio broadcasting method of claim 13, wherein the equipment transmits at least one of Amplitude Modulation (AM), Frequency Modulation (FM) and Hybrid Digital (HD) Radio signals.

23. The radio broadcasting method of claim 13, wherein the additional information is promotional information that is specific to an advertiser with a location within the broadcast area geographic region that corresponds to the location of the at least one of the plurality of auxiliary transmitters within the broadcast area.

24. The radio broadcasting method of claim 13, wherein the retrieval of the additional information is also based on location information indicating a location of the at least one receiver to determine what additional information is to be retrieved from the remote server.

25. Radio broadcasting equipment comprising:
at least one auxiliary transmitter associated with at least one main transmitter that transmits radio broadcast area wide programming for a radio broadcasting station in a radio broadcast service area licensed by the Federal Communications Commission (FCC), wherein the FCC radio broadcast service area is specific to and limited to a geographic region licensed by the FCC, wherein the radio broadcasting station transmits radio broadcast area wide programming in the FCC radio broadcast service area on both the at least one main transmitter and the plurality of auxiliary transmitters on a single frequency network transmission frequency licensed by the FCC in the FCC licensed radio broadcast service area for transmission using the plurality of auxiliary transmitters and the corresponding at least one main transmitter; and a controlling mechanism that controls the at least one auxiliary transmitter to switch on transmission of localized auxiliary information content on the single frequency network transmission frequency licensed to the radio broadcasting station licensed by the FCC in the FCC licensed radio broadcast service area for transmission using the at least one auxiliary transmitter and the corresponding at least one main transmitter, wherein the localized auxiliary information content includes a data item that enables automatic retrieval of additional information that is different and in addition to the radio broadcast area wide programming, wherein the additional information is automatically retrieved from a remote server by equipment that includes at least one receiver configured to receive radio broadcast content, wherein the at least one receiver receives the data item and includes a software application configured to receive and analyze the received localized auxiliary information, output at least a portion of the localized auxiliary information content to a user, and automatically retrieve the additional information for output to the user from the remote server in response to the data item being analyzed by the software application, and wherein the additional information is information that is specific to a location within the radio broadcast area geographic region of the FCC licensed radio broadcasting station's area that corresponds to both a location of the at least one receiver receiving the radio broadcast content and a location of the at least one auxiliary transmitter within the FCC licensed radio broadcast service area.

26. The radio broadcasting equipment of claim 25, wherein the data item is a Quick Response (QR) code.

27. The radio broadcasting equipment of claim 25, wherein the localized auxiliary information includes an indication of identity of the advertiser.

28. The radio broadcasting equipment of claim 25, further comprising the at least one receiver configured to receive radio broadcast content, wherein the localized auxiliary information includes instructions to obscure display of the data item depending on movement of the at least one receiver.

29. The radio broadcasting equipment of claim 28, wherein the localized auxiliary information is stored in the at least one receiver in preparation of displaying the data item following detection that the at least one receiver is stationary.

30. The radio broadcasting equipment of claim 28, wherein the at least one receiver is included in a transportation vehicle.

31. The radio broadcasting equipment of claim 30, wherein a determination of whether to output the data item on a display that is part of an infotainment system included in the transportation vehicle is performed and is based on a state of the transportation vehicle determined based on data received from the infotainment system.

32. The radio broadcasting equipment of claim 31, wherein the data received from the transportation vehicle indicates whether the transportation vehicle is in park.

33. The radio broadcasting equipment of claim 25, wherein the additional information provides details associated with an America's Missing: Broadcast Emergency Response (AMBER) alert or a localized emergency within the broadcast area.

34. The radio broadcasting equipment of claim 25, wherein the equipment transmits at least one of Amplitude Modulation (AM), Frequency Modulation (FM) and Hybrid Digital (HD) Radio signals.

35. The radio broadcasting system of claim 25, wherein the additional information is promotional information that is specific to an advertiser with a location within the broadcast area geographic region that corresponds to the location of the at least one of the plurality of auxiliary transmitters within the broadcast area.

36. The radio broadcasting system of claim 25, wherein the retrieval of the additional information is also based on location information indicating a location of the at least one receiver to determine what additional information is to be retrieved from the remote server.

37. A method to transmitting broadcast area wide programming content and localized auxiliary information content within a single broadcast area using radio broadcasting equipment, the method comprising:
   operating a plurality of transmitters including a main transmitter and at least one auxiliary transmitter configured to transmits radio broadcast area wide programming for a radio broadcasting station in a radio broadcast service area licensed by the Federal Communications Commission (FCC), wherein the FCC radio broadcast service area is specific to and limited to a geographic region licensed by the FCC,
   wherein the radio broadcasting station transmits radio broadcast area wide programming in the FCC radio broadcast service area on both the at least one main transmitter and the plurality of auxiliary transmitters on a single frequency network transmission frequency licensed by the FCC in the FCC licensed radio broadcast service area for transmission using the plurality of auxiliary transmitters and the corresponding at least one main transmitter; and
   controlling the at least one auxiliary transmitter to switch on transmission of localized auxiliary information content by the at least one auxiliary transmitter on the single frequency network transmission frequency licensed to the radio broadcasting station licensed by the FCC in the FCC licensed radio broadcast service area for transmission using the at least one auxiliary transmitter and the corresponding at least one main transmitter,
   wherein the localized auxiliary information content includes a data item that enables automatic retrieval of additional information that is different and in addition to the radio broadcast area wide programming,
   wherein the additional information is automatically retrieved from a remote server by equipment that includes at least one receiver configured to receive radio broadcast content,
   wherein the at least one receiver receives the data item and includes a software application configured to receive and analyze the received localized auxiliary information, output at least a portion of the localized auxiliary information content to a user, and automatically retrieve the additional information for output to the user from the remote server in response to the data item being analyzed by the mobile software application, and
   wherein the additional information is information that is specific to a location within the radio broadcast area geographic region of the FCC licensed radio broadcasting station's area that corresponds to both a location of the at least one receiver receiving the radio broadcast content and a location of the at least one auxiliary transmitter within the FCC licensed radio broadcast service area.

38. The radio broadcasting method of claim 37, wherein the data item is a Quick Response (QR) code.

39. The radio broadcasting method of claim 37, wherein the localized auxiliary information includes an indication of identity of the advertiser or publisher.

40. The radio broadcasting method of claim 37, wherein at least one receiver configured to receive radio broadcast content, wherein the localized auxiliary information includes instructions to obscure display of the data item depending on movement of the at least one receiver.

41. The radio broadcasting method of claim 40, wherein the localized auxiliary information is stored in the at least one receiver in preparation of displaying the data item following detection that the at least one receiver is stationary.

42. The radio broadcasting method of claim 40, wherein the at least one receiver is included in a transportation vehicle.

43. The radio broadcasting method of claim 42, wherein a determination of whether to output the data item on a display that is part of an infotainment system included in the transportation vehicle is performed and is based on a state of the transportation vehicle determined based on data received from the infotainment system.

44. The radio broadcasting method of claim 43, wherein the data received from the transportation vehicle indicates whether the transportation vehicle is in park.

45. The radio broadcasting method of claim 37, wherein the additional information provides details associated with an America's Missing: Broadcast Emergency Response (AMBER) alert or a localized emergency within the broadcast area.

46. The radio broadcasting method of claim 37, wherein the equipment transmits at least one of Amplitude Modulation (AM), Frequency Modulation (FM) and Hybrid Digital (HD) Radio signals.

47. The radio broadcasting method of claim 37, wherein the additional information is promotional information that is specific to an advertiser with a location within the broadcast area geographic region that corresponds to the location of the at least one of the plurality of auxiliary transmitters within the broadcast area.

48. The radio broadcasting method of claim 37, wherein the retrieval of the additional information is also based on location information indicating a location of the at least one receiver to determine what additional information is to be retrieved from the remote server.

* * * * *